United States Patent
Fries et al.

(10) Patent No.: US 7,730,538 B2
(45) Date of Patent: Jun. 1, 2010

(54) COMBINING VIRUS CHECKING AND REPLICATION FILTRATION

(75) Inventors: Robert M. Fries, Redmond, WA (US); Shiraz M. Somji, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 11/421,996

(22) Filed: Jun. 2, 2006

(65) Prior Publication Data

US 2007/0283438 A1   Dec. 6, 2007

(51) Int. Cl.
G06F 21/00 (2006.01)
(52) U.S. Cl. .............................. 726/24; 726/22; 726/23
(58) Field of Classification Search .................. 726/24, 726/22, 23
See application file for complete search history.

(56) References Cited

U.S. PATENT DOCUMENTS

| | | | |
|---|---|---|---|
| 5,440,723 A * | 8/1995 | Arnold et al. ................... 714/2 |
| 5,819,272 A | 10/1998 | Benson | |
| 5,832,208 A | 11/1998 | Chen et al. | |
| 5,956,481 A | 9/1999 | Walsh et al. | |
| 5,995,980 A | 11/1999 | Olson et al. | |
| 6,253,211 B1 | 6/2001 | Gillies et al. | |
| 6,405,219 B2 | 6/2002 | Saether et al. | |
| 6,477,583 B1 | 11/2002 | Zayas et al. | |
| 6,611,850 B1 * | 8/2003 | Shen .......................... 707/204 |
| 6,748,534 B1 * | 6/2004 | Gryaznov et al. ........... 713/188 |
| 6,931,552 B2 | 8/2005 | Pritchard et al. | |
| 6,973,464 B1 | 12/2005 | Gao | |
| 7,437,760 B2 * | 10/2008 | Dettinger et al. ............... 726/24 |
| 7,475,427 B2 * | 1/2009 | Palliyil et al. .................. 726/24 |
| 7,523,487 B2 * | 4/2009 | Muhlestein ..................... 726/3 |
| 2003/0005109 A1 | 1/2003 | Kambhammettu et al. | |
| 2004/0107199 A1 * | 6/2004 | Dalrymple et al. ........... 707/100 |
| 2004/0193952 A1 | 9/2004 | Narayanan et al. | |
| 2004/0199552 A1 | 10/2004 | Ward et al. | |
| 2005/0021524 A1 | 1/2005 | Oliver | |
| 2005/0114411 A1 * | 5/2005 | Childs et al. ................. 707/204 |
| 2005/0132184 A1 * | 6/2005 | Palliyil et al. ................ 713/152 |
| 2005/0262170 A1 | 11/2005 | Girkar et al. | |
| 2006/0047929 A1 * | 3/2006 | Otani et al. .................. 711/162 |

(Continued)

FOREIGN PATENT DOCUMENTS

KR       1020010044706       6/2001

(Continued)

Primary Examiner—Edan Orgad
Assistant Examiner—Bradley Holder
(74) Attorney, Agent, or Firm—Workman Nydegger

(57) ABSTRACT

Data in backup systems can be effectively protected against viruses, even if definitions for certain viruses are found after infected data have been backed up to a backup server. In one implementation, a combined filter that includes antivirus and replica filtering components can identify and process I/O system calls (e.g., including writes to files). If a virus is present, the antivirus component of the combined filter can mark the file and/or file write (and cleanse the file/file write), and pass that information to the replica component. If the file write is associated with a file to be backed up, the replica component can then pass along the antivirus filter's indications with a copy of the file write. The backup server can also identify that previous versions of the file stored at the backup server may have been infected, and can thus perform any appropriate actions.

13 Claims, 4 Drawing Sheets

U.S. PATENT DOCUMENTS

2006/0130144 A1* 6/2006 Wernicke ............... 726/24
2006/0272012 A1* 11/2006 Wu ........................ 726/6
2007/0143843 A1* 6/2007 Nason et al. ............. 726/22
2007/0192553 A1* 8/2007 Otani et al. ............. 711/162
2007/0198789 A1* 8/2007 Clark et al. ............. 711/162

FOREIGN PATENT DOCUMENTS

KR 1020040083409 10/2004

* cited by examiner

COMBINING VIRUS CHECKING AND REPLICATION FILTRATION

CROSS-REFERENCE TO RELATED APPLICATIONS

N/A

BACKGROUND

Background and Relevant Art

Due at least in part to the ubiquity of electronic files, individuals and organizations alike have needs to protect electronic files on a regular basis. One way of protecting electronic files is by backing up the files periodically to create a reliable restoration for the data. Whether at the individual level or at the enterprise level, conventional backup systems for doing this can include one or more replication filters that identify whether writes to data are meant to be backed up at a backup server. For example, a user might make one or more writes to data, the replication filter might then intercept each write, and then determine if the write pertains to data that is meant to be protected (i.e., backed up). If the file is meant to be protected, the replication filter could then pass the write to a log file of multiple such writes.

The log file (or a corresponding copy thereof) could then be sent to one or more backup servers. For example, a user at a personal computer might run one or more backup processes that replicate the log file and/or any other such identified data to one or more local or remote storage allocations, such as those associated with a particular backup server. Similarly, one or more replica agents at a production server might schedule a backup of a log file on the production server, and then pass the new data writes to one or more storage allocations at a backup server. At a later point, the user (or production server administrator) might then be able to request data associated with the replicated log file from the backup server.

Backing up data in this manner, however, is only one way of protecting data. Other ways of protecting data include, for example, virus scanning. In particular, it is well known that computer viruses can destroy data, and wreak having on computer systems, which can lead to further loss of files not originally infected. To mitigate such threats, therefore, a user or administrator might install one or more antivirus programs at one or more computer systems. One way that conventional antivirus software can work is through one or more antivirus filters that identify writes to a particular file, and then scan the write to determine if the write contains a known virus. The antivirus software's ability to recognize a virus is typically based on a set of antivirus definitions, which the antivirus filter checks when scanning file writes. As such, whether the antivirus filter identifies the virus will depend on how up-to-date the antivirus definitions are. Specifically, if the antivirus software has not been recently updated, the antivirus filter(s) might identify that a particular file (or file write) is clean even though the file might actually contain a recently-created virus.

One can appreciate, therefore, that an entity (individual or organization, etc.) may install a number of different programs to protect data, which may include a number of different software filters operating independently of each other. In one conventional example, each software program that has a filter will first register that filter (e.g., antivirus filter and/or replication filter) with an operating system's filter manager. The filter manager, in turn, passes each file write to each filter when or if appropriate. In general, it can be difficult to configure how each software filter might register with the filter manager to ensure any needed ordering. As a result, it may be that the filter manager sends the file writes to a replication filter and then to an antivirus filter. In other cases, of course, the filter manager might first send the file write to the antivirus filter before sending it to the replication filter.

Unfortunately, even though the specific ordering of filters can be difficult to configure, the ordering of filters can have a significant impact on how the data are protected and/or preserved. For example, one particularly sensitive problem with organizations that implement backup systems is that failure to account for certain electronic viruses can mean potentially greater proliferation of the viruses during backup processes. This problem can be particularly acute where, for example, a replication filter receives file writes and sends them to a log file before those file writes are reviewed by an anti-virus filter. Such an ordering of filters could mean in some cases that an infected file might not be treated or even identified as infected until as late as after the file is passed to a backup server.

By contrast, even if it were possible to ensure that the antivirus filter receives file writes before a replication filter, this would not necessarily solve all potential problems. For example, an infected file on a computer system could go undetected if the antivirus definitions used by the antivirus filter are out-of-date, such as if a definition has not yet been created for the virus infecting the file. As such, the file may have been replicated one or more times by a replication filter, even though first checked by an antivirus filter. This could mean, therefore, that several backup copies could exist of the infected version of the file at the backup server. When the antivirus definitions are updated for the antivirus filter to include this particular virus, the antivirus filter could ultimately identify that new file writes are infected.

In most cases, however, the antivirus filter would simply scrub or delete the infected file write and/or the corresponding entire base file at the production server. Unfortunately, the replica filter will not generally have any knowledge of the virus identifications and/or cleansing actions by the antivirus filter, and thus will simply replicate the cleaned file writes. The replicated file and/or file writes for the cleansed file would then be passed to a log file and/or otherwise replicated back to the backup server as done normally. As such, the backup server would be unaware that the file was ever infected, and would simply store the file backup updates (i.e., including the new file writes) along with the previously infected file data. Thus, even though the antivirus filter might be positioned ahead of the replication filter at a production server, there would be no guarantee that infected data at the backup server would be cleansed.

Accordingly, there are a number of difficulties associated with addressing virus information within backup systems.

BRIEF SUMMARY

Implementations of the present invention provide systems, methods, and computer program products that effectively propagate antivirus information throughout data in a backup environment. In at least one implementation, for example, a common filter comprises antivirus and replica filter components. The common filter can receive file writes, and pass the file writes to the antivirus component. The antivirus component scans each file write, and passes each scanned file write along with any appropriate antivirus information for the file write to the replica filter component of the common filter. The replica filter can thus replicate certain file writes to a log file in a manner that maintains whatever virus information may have been previously detected. As such, both a production server and a backup server can identify whether received backup data, or previously received backup data should receive antivirus attention.

For example, one example method from the perspective of a production server of managing virus and backup filtration processes through a common filter can involve identifying one or more writes to files through the common filter. In addition, the method can involve scanning the identified one or more file writes at the common filter in accordance with one or more virus definitions. The method can also involve comparing the identified one or more scanned file writes at the common filter with one or more replica policies. Furthermore, the method can involve sending a copy of at least one of the one or more scanned file writes to a log file, such that the at least one file write is replicated to a backup server.

By contrast, an example method from the perspective of a backup server of managing replicated data in accordance with one or more virus indicators can involve receiving one or more data backups from one or more production servers. In addition, the method can involve identifying one or more virus indicators in the received one or more data backups. In such a case, the one or more virus indicators can identify that at least one of the one or more data backups is associated with infected data. The method can also involve identifying one or more policies for the backup server. In general, the one or more policies can identify one or more response actions that correspond to the one or more virus indicators. Furthermore, the method can involve executing any of the one or more response actions in accordance with the one or more policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
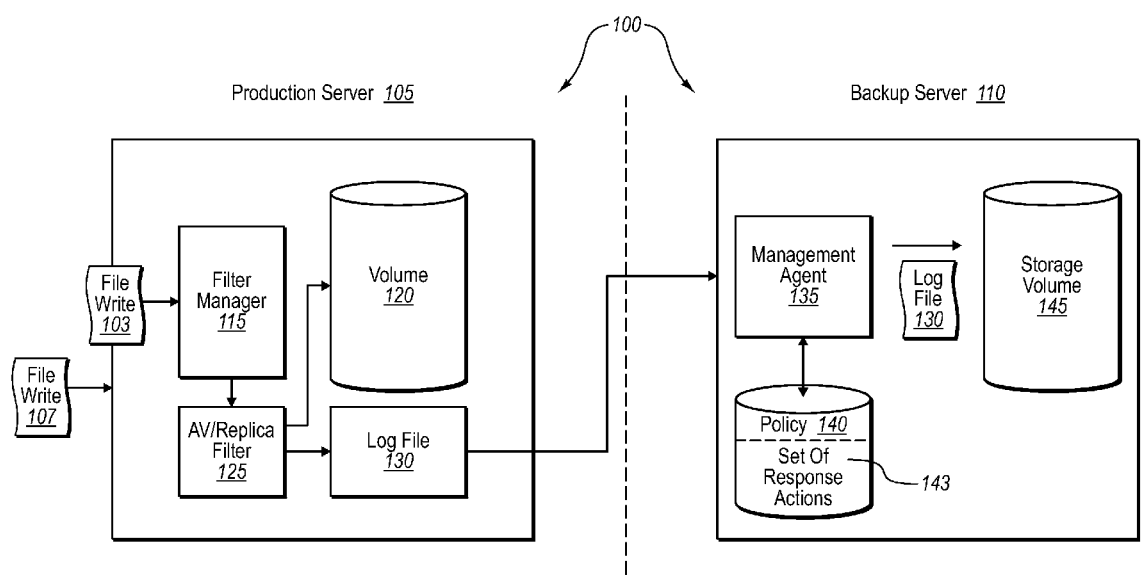
FIG. 1A illustrates an overview schematic diagram in accordance with an implementation of the present invention in which a production server scans file writes through a common antivirus/replica filter, and provides those file writes to a backup server.

Implementations of the present invention extend to systems, methods, and computer program products that effectively propagate antivirus information throughout data in a backup environment. In at least one implementation, for example, a common filter comprises antivirus and replica filter components. The common filter can receive file writes, and pass the file writes to the antivirus component. The antivirus component scans each file write, and passes each scanned file write along with any appropriate antivirus information for the file write to the replica filter component of the common filter. The replica filter can thus replicate certain file writes to a log file in a manner that maintains whatever virus information may have been previously detected. As such, both a production server and a backup server can identify whether received backup data, or previously received backup data should receive antivirus attention.

As will be understood more fully herein, these and other features of the present invention can be accomplished using any number of components, modules, and schemes. For example, implementations of the present invention are described below primarily from the perspective of a production server and a backup server that communicate data created and/or modified at the production server. Such a setup, however, is not necessarily required in all implementations. In particular, the production server could be representative of a personal computer system in some cases that is backed up directly by another computer system, regardless of whether such computer systems might be regarded as a "server," as such.

In addition, implementations of the present invention are described primarily herein in terms of actions taken by a "common" filter, which provides a single, common interface through which antivirus and replica filter-type component functionality is accessed. This common filter can also thus be described as a "combined" filter, which is a filter that provides the combined functions of an antivirus filter and a replica filter. In any event, and as will be appreciated herein, because a single filter can be constructed with both antivirus and replica filtration components, the developer that creates the single filter can design the ordering for each component. That is, the developer can configure the filter so that Input/Output ("I/O") system calls are handled first by, for example, the antivirus component, and next handled by the replica component. As such, only a single filter, such as the common filter, will need to be registered with a filter manager pursuant to handling antivirus and replica filtration activities.

One will appreciate, however, that a combined/common filter is simply one way of accomplishing one or more implementations of the present invention. In alternative implementations, for example, a developer could create separate antivirus and replica filters that have appropriate means for identifying and communicating with each other in a particular order. In particular, the antivirus and replica filters could be installed separately at a production server, but in a specific order to ensure a particular order with a filter manager. The antivirus and replica filters could then be provided with one or more means to identify and communicate with each other through, for example, an out-of-band communication channel. As such, one will appreciate after reading the following specification and claims that there are a number of ways to practice the principles described herein.

In any event, FIG. 1A illustrates an overview schematic diagram of a backup system 100 in which a production server 105 receives one or more file writes, scans these file writes with antivirus and replica components of a common filter, and passes one or more of these writes to backup server 110. In general, a file write (e.g., 103, 107) can be generated any time a user (or other entity) creates data, amends or changes existing data, or the like. Production server 105 can then intercept or "filter" each of these file writes using any number of mechanisms. In at lease one implementation of the present invention, for example, production server 105 intercepts and receives each file write 103, 107 through a filter manager 115.

Figure 1B:
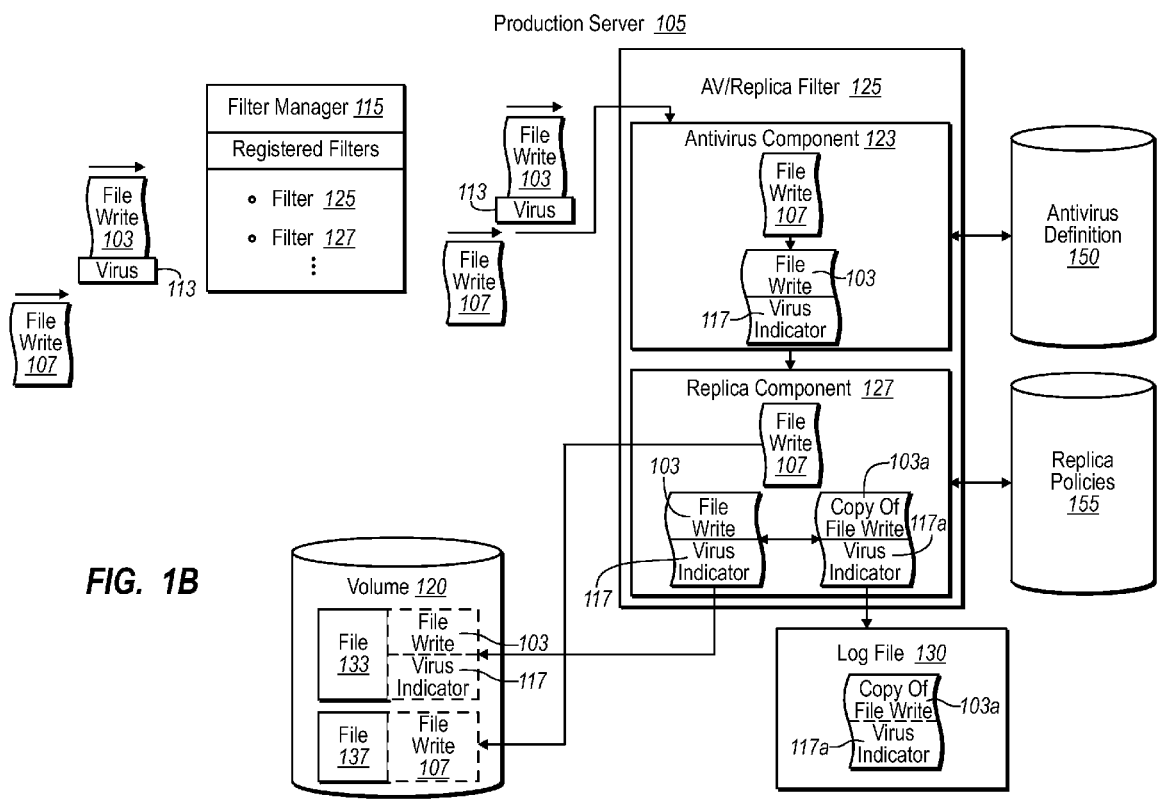
FIG. 1B illustrates a more detailed schematic of processes at the production server in accordance with an implementation of the present invention in which the common antivirus/replica filter marks one or more of the received file writes with one or more virus indicators prior to sending the file writes to a log file.

Generally, filter manager 115 can be configured to intercept each I/O system call at production server 105, and pass each such call to one or more registered filters (e.g., filters 125, 127, FIG. 1B). Such calls can include any number of system requests, such as "open file," "close file," as well as various writes, deletions, alterations to files, and so forth. Specifically, each change to a file can generate an I/O system call, and there can be tens or hundreds of different I/O system calls in some cases for which filter manager 115 may be configured to intercept. However configured, filter manager 115 will ultimately distribute the various calls it intercepts to any number of filters that are registered therein. In particular, some filters, such as an antivirus filter, may be configured to receive all calls intercepted by filter manager 115, while other filters may only be configured to receive certain types of calls in the I/O system.

In at least one implementation of the present invention, filter manager 115 can be configured to pass all system calls (e.g., file writes) to combined antivirus ("AV") and replica filter 125 (or "combined" or "common" filter 125). For example, filter manager 115 receives file writes 103, 107, and passes each of these file writes to common filter 125. As will be understood more fully herein, common filter 125 can then scan each received file write for viruses, and, if appropriate, pass a copy of any one or more of these file writes to log file 130. In general, a "log file," such as log file 130, generally comprises one or more electronic files configured to hold copies of all changes to specified data (creation, deletion, modification, etc.) for a particular production server 105 volume. For example, log file 130 can represent all changes to volume 120 for a specific time.

Backup server 110 can then backup log file 130 (as well as any additional log files for other volumes at production server 105). In general, backup processes can be performed under any number of circumstances, such as, on demand, or per a specific backup schedule. In any case, backup processes generally involve production server 105 can sending the data of log file 130 to one or more management agents (e.g., 135) at backup server 110. Typically, the one or more management agents (e.g., 135) would then apply the received data changes to one or more storage volumes (e.g., 145), which may contain other prior copies of changes to particular data.

In accordance with implementations of the present invention, however, the one or more management agents (e.g., 135) can also compare the received backup data to one or more policy settings 140 pursuant to performing a particular response action 143. As will be understood more fully herein, for example, if management agent 135 identifies that any of the data in log file 130 have been flagged for viruses (i.e., include one or more virus indicators), policy settings 140 may instruct backup server 110 to perform any number of corresponding response actions 143. For example, policy settings 140 may instruct backup server 110 to delete the received data marked with viruses, "scrub" (i.e., clean or remove viruses) or delete the received backup data, as well as scrub or delete prior copies of the data.

Accordingly, at least one aspect of the present invention involves not only scanning for viruses, but also ensuring that any information about virus detections can be effectively propagated to the relevant entities in system 100. In at least one implementation, for example, this can be accomplished by tagging file writes with one or more virus indicators, and ensuring the one or more virus indicators remain attached, as appropriate. For example, FIG. 1B illustrates a more detailed schematic diagram in accordance with an implementation of the present invention in which production server 105 identifies one or more viruses through a common filter 125, and uses the common filter 125 to attach one or more virus indicators to infected files.

In particular, FIG. 1B shows that filter manager 115 can receive file writes 103 and 107, such as described previously in FIG. 1A. Furthermore, FIG. 1B shows that at least file write 103 is infected with a virus (e.g., 113). Filter manager 115 then passes the file writes 103 and 107 to any number of appropriately registered filters, such as filters 125, 127, etc. For example, FIG. 1B shows that filter manager 115 passes file write 103 (and attached virus 113) as well as file write 107 to common AV/Replica filter 125. As previously mentioned, common filter 125, in turn, can comprise any number of suitable components, including at least antivirus component 123 and replica component 127. In general, filter 125 can be configured so that all writes received from filter manager 115 are passed initially to antivirus component 123 before being passed to replica component 127. Ordering of components in this manner, however, may not necessarily be required so long as file writes can be tagged with one or more virus indicators before being passed to a log file (e.g., 130).

In any event, FIG. 1B shows that common filter 125 can receive file writes 103 and 107, and perform any number of scanning and tagging actions thereon. For example, antivirus component 123 of filter 125 can scan file write 103, and compare the data contained therein to any number of antivirus definitions 150. In this case, filter 125 identifies the presence of virus 113 on file write 103. By contrast, antivirus component 123 also receives file write 107, but does not recognize any virus(es) therein. Accordingly, FIG. 1B shows that antivirus component 123 simply passes along file write 107 to replica component 127 as is, but, with respect to file write 103, can perform a number of additional actions.

For example, upon detecting virus 113, antivirus component 123 can remove the virus. In other cases, however, antivirus component 123 may simply detect the virus and not remove it, or detect what appears to be the virus and provide an indication that a virus might be present. As such, FIG. 1B shows that antivirus component 123 marks file write 103 with one or more virus indicators 117, which include indications regarding the actions and/or determinations of antivirus component 123. For example, the one or more virus indicators 117 can include information that there is a virus 113 still contained inside file write 103, or that there only appears to be virus 113 present, though unconfirmed. Similarly, the one or more virus indicators 117 could indicate that the antivirus component 123 has both detected and removed virus 113 from file write 103, but that virus 113 was nevertheless at one time present. Thus, one will appreciate that the one or more virus indicators 117 can include any number of indications that can allow following components and modules to make additional decisions on file write 103, as well as on its underlying file (e.g., 133).

However marked or tagged, antivirus component 123 can then send file write 103 onto replica component 127 along with the one or more virus indicators 117. For example, FIG. 1B shows that replica component receives both file writes 103 and 107. Ultimately, replica component 127 will compare each of these file writes 103, 107 with replica policies 155 to determine whether the files associated with these file writes are scheduled for replication. For example, FIG. 1B shows that file write 107 is not scheduled for replication, and, as such, replica component 127 simply passes file write 107 to volume 120, and adds this file write to corresponding file 137. By contrast, FIG. 1B shows that replica component 127 determines that file write 103 is associated with file 133, which, based on replica policies 155, is scheduled for replication.

Of course, replica agent 127 can alter its customary mechanisms based on the presence of any virus indicators (e.g., 117). For example, replica policies 155 may indicate that a file otherwise scheduled to be replicated be precluded from replication when one or more virus indicators (e.g., 117) are present. That is, replica component 127 could quarantine file write 103, pass file write 103 to volume 120 without placing a copy in log file 130, and may also (or alternatively) send one or more virus indicators to log file 130 without the corresponding file write data. Thus, there are a number of actions for which replica component 127 can be configured.

In any event, FIG. 1B shows that replica component 127 identifies that file write 103 is to be replicated, and thus creates a copy 103a of the file write. As shown, file write copy 103a also includes a copy of the one or more virus indicators (i.e., 117a). As such, FIG. 1B shows that replica component 127 passes file write 103 to volume 120, where it is included with its underlying base file 133. By contrast, replica component 127 passes file write copy 103a and corresponding virus indicator copy(ies) 117a to log file 130. As a result, file write 103, as well as the attached one or more virus indicators 117, can be included in the backup processes (i.e., via copies 103a, 117a).

Figure 1C:
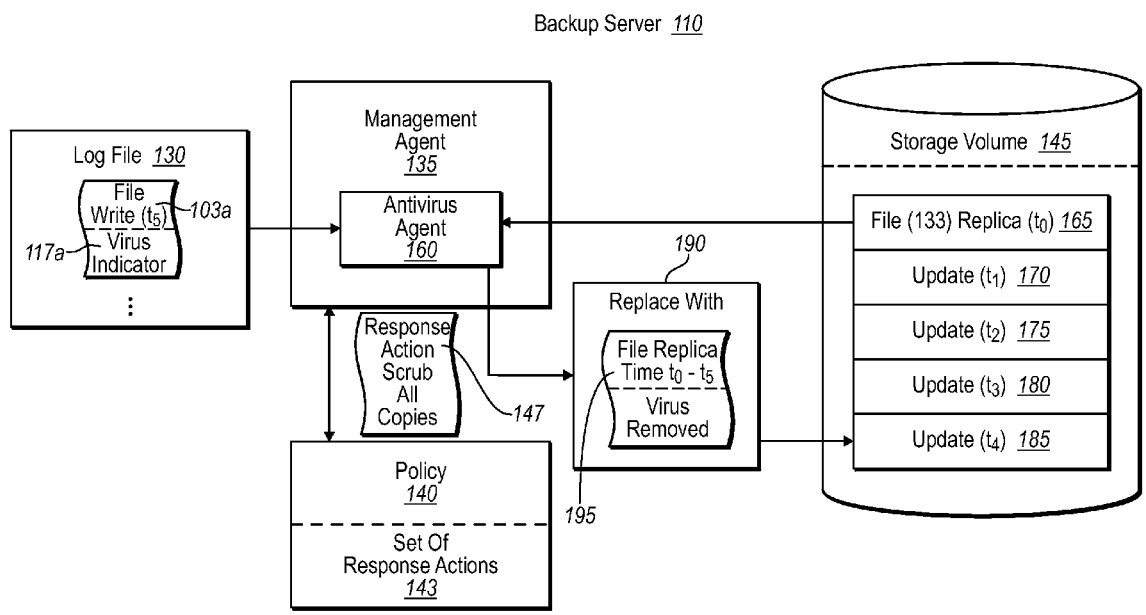
FIG. 1C illustrates a schematic diagram in which the backup server receives one or more data backups that include one or more virus indicators, and performs one or more corresponding response actions thereon in accordance with an implementation of the present invention.

As previously mentioned, this means that backup server 110 can thus receive and identify any known virus information for (and perform corresponding actions on) received or stored data, without necessarily requiring backup server 110 to perform additional virus scans. As shown in FIG. 1C, for example, backup server 110 receives the data of log file 130, which includes the most recent file write copy 103a and corresponding one or more virus indicators 117a. In particular, backup server 110 receives and identifies the data of log file 130 through one or more management agents (e.g., 135). In general, a management agent comprises any number of computer-executable instructions that are implemented for any number of processes, such as initiating replication processes, performing actions on received data, and so forth. Specifically, each management agent 135 can further include (or be associated with) one or more addition agents, such as antivirus agent 160.

Thus, upon receiving log file 130, management agent 135 can identify the one or more virus indicators 117a. Management agent 135 can then determine that one or more actions should be taken, and thus further consults the one or more policy settings 140. For example, the one or more policy settings 140 may include one or more instructions to discard an infected file write, quarantine an infected file write, and/or perform similar actions on prior copies of the data. As shown in FIG. 1C, for example, management agent 135 identifies from policy settings 140 a set of instructions to perform the response action 147. In this example, response action 147 includes instructions to "scrub" all copies of the underlying base file 133 replica, and iterative updates thereof. Specifically, policy settings 140 may tell management agent 135 that any time a virus indicator (e.g., 117) is received for a particular file write (e.g., 103a), the underlying base file (e.g., replica 165) is presumed to contain a virus.

For example, backup server 110 has already stored (e.g., via storage a number of prior copies (based on different backup events) of file 133. In particular, FIG. 1C shows that backup server 110 has stored an initial replica 165 of file 133 at time "$t_0$," an update 170 of the file for time "$t_1$," an update 175 of the file for time "$t_2$," an update 180 for time "$t_3$," and an update 185 for time "$t_4$." Thus, file write 103a would be, in this case, an update to replica 165 (i.e., for file 133) at time "$t_5$."

In this particular example, therefore, and in response to the instructions of response action 147, management agent 135 scrubs file write 103a (if not already scrubbed or "cleansed") through antivirus agent 160. Management agent 135 can also use antivirus agent 160 to scrub each of the different replicas 165, 170, 175, 180, 185. Having so cleansed each copy, therefore, management agent 135 sends corresponding instructions 190 to replace file replicas 165, 170, 175, 180 and 185 with the new data 195. Data 195, in turn, can include the base file and following updates (i.e., "$t_0$-$t_5$") without the identified virus.

Figure 2:
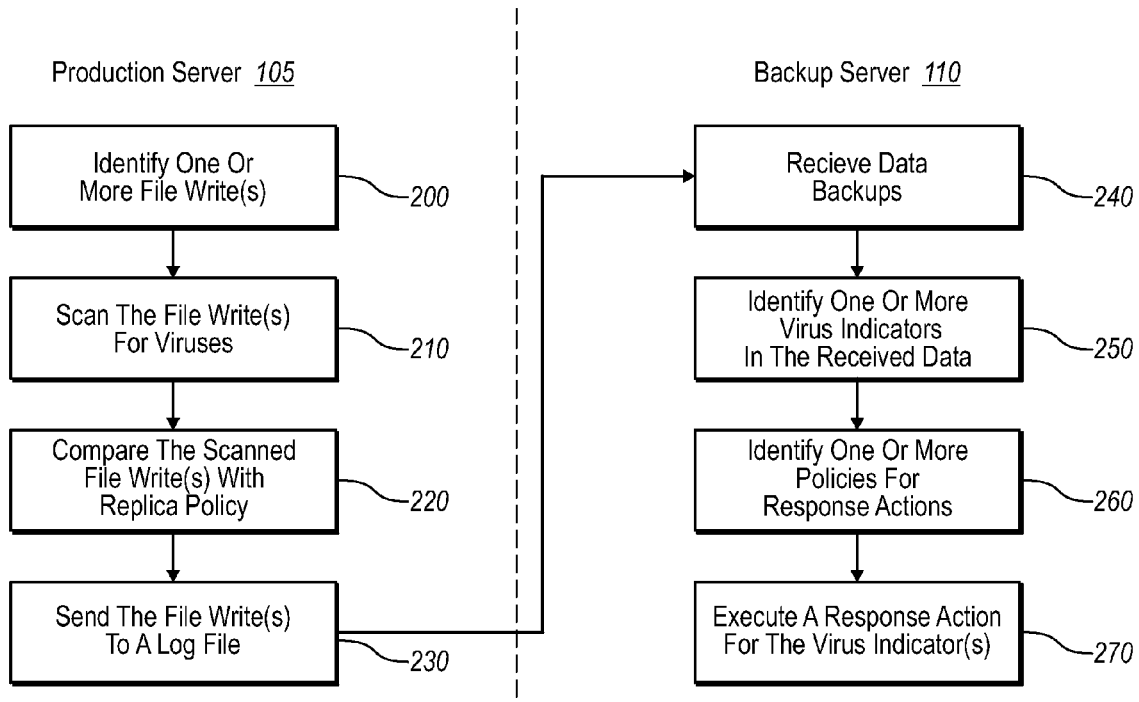
FIG. 2 illustrates flowcharts of methods from the perspectives of a production server and of a backup server for propagating antivirus annotations for file writes throughout a backup system, in accordance with an implementation of the present invention.

Accordingly, FIGS. 1A-1C provide a number of schematics and components for identifying viruses at a production server level, propagating that information to a backup server level, and performing any number of corresponding actions at each such level. In addition to the foregoing, implementations of the present invention can also be described in terms of flow charts of methods comprising one or more sequences of acts for accomplishing a particular result. For example, FIG. 2 illustrates flow charts both from the perspective of production server 105 and of backup server 110 of filtering file writes using a common/combined AV/replica filter 125. The acts of FIG. 2 are described below with reference to the schematics and components of FIGS. 1A through 1C.

For example, FIG. 2 shows that a method from the perspective of production server 105 of managing virus and backup filtration processes through a common filter can comprise an act 200 of identifying one or more file writes. Act 200 includes identifying one or more writes to files through a common filter. For example, as shown in FIGS. 1A and 1B production server 105 receives file writes 103 and 107 (i.e., any number of I/O system calls) through filter manager 115. Filter manager 115 in turn passes these writes to common AV/replica filter 125.

In addition FIG. 2 shows that the method from the perspective of production server 105 can comprise and act 210 of scanning the file writes for viruses. Act 210 can include scanning the identified one or more file writes at the common filter in accordance with one or more virus definitions. As shown in FIG. 1B, for example, a common AV/replica filter 125 receives file writes 103 and 107 and compares the corresponding data with one or more antivirus definitions 150 through antivirus component 123. Common AV/replica filter 125 thus determines through antivirus component 123 that file write 103 includes virus 113.

FIG. 2 also shows that the method from the perspective of production server 105 can comprise an act 220 of comparing the scanned files with replica policy. Act 220 includes comparing the identified one or more scanned file writes at the common filter with one or more replica policies. For example, FIG. 1B shows that AV/replica filter 125 also receives the file writes 103 and 107 in replica component 127 after having been treated/scanned by antivirus component 123. Replica component 127 then compares file writes 103 and 107 with replica policies 155 to determine whether these file writes are meant to be protected through backup processes.

Furthermore, FIG. 2 shows that the method from the perspective of production server 105 can comprise an act 230 of sending the file writes to a log file. Act 230 includes sending a copy of at least one of the one or more scanned file writes to a log file, such that the at least one file write is replicated to a backup server. As shown in FIG. 1B for example, although common AV/replica filter 125 receives file writes 103 and 107, replica filter identifies that only file write 103 is scheduled to be replicated. Accordingly, replica component 127 copies only file write 103 (i.e., as copy 103a) to log file 130, but sends both file writes 103 and 107 to storage volume 120.

As such, FIG. 2 shows that a method from the perspective of backup server 110 of managing replicated data in accordance with one or more virus indicators provided by a common filter at one or more production servers can comprise an act 240 of receiving data backups. Act 240 includes receiving one or more data backups from one or more production servers. For example, as shown in FIG. 1C, management agent 130 of backup server 110 receives the backup data of at least log file 130 from production server 105.

In addition, FIG. 2 shows that the method from the perspective backup server 110 can comprise an act 250 of identifying one or more virus indicators in the received data. Act 250 includes identifying one or more virus indicators in the received one or more data backups, wherein the one or more virus indicators identify that at least one of the one or more data backups is associated with infected data. For example, FIG. 1C shows that management agent 135 receives data of log file 130, which includes file write 103a and one or more of the virus indicators 117a. Accordingly, management agent 135 identifies from the one or more virus indicators 117a that a virus exists, or that a virus has been removed but nevertheless existed on a previous version of the file.

FIG. 2 also shows that the method from the perspective of backup server 110 can comprise an act 260 of identifying one or more policies for response actions. Act 260 includes identifying one or more policies for the backup server, wherein the one or more polices identify one or more response actions corresponding to the one or more virus indicators. For example, FIG. 1C shows that management agent 135 consults policy settings 140, and receives instructions to implement response action 147, which require backup server 110 to scrub all prior or present copies of file 133 (i.e., the underlying file for write 103a).

Furthermore, FIG. 2 shows that a method from the perspective of backup server 110 can comprise an act 270 of executing a response action for the virus indicators. Act 270 includes executing any of the one or more response actions in accordance with the one or more policies. For example, FIG. 1C shows that management agent 135 (e.g., via antivirus agent 160) takes each baseline copy and update for file 133 (i.e., for times "$t_0$"-"$t_5$") and removes any virus infections. Management agent 135 then prepares a clean copy 195 of this data, and sends corresponding instructions 190 to replace the original copies of this data 165, 170, 175, 180, 185 in storage volume 145 with the new, clean data 195.

Accordingly, FIGS. 1A-2 provide a number of components and mechanisms for ensuring that identified virus information can be efficiently propagated throughout backup system 100. As a result of these and other features, the threats associated with inadvertent replication of viruses can be more effectively mitigated. In particular, wide distribution of virus information allows for a number of additional features in accordance with the principles discussed herein. For example, production server 105 could receive one or more requests for data that are or have been infected. Production server 105, such as through common filter 125, could determine that the request relates to one or more files that are associated with one or more virus indicators, and deny or allow the request based on any number of production server policies.

Requests for certain backup data can also be treated in a similar fashion. For example, a user might request one or more files that have been stored on backup server 110 (i.e., have been backed up). Common filter 125 (or another appropriate agent) could identify from an index that the request involves one or more files that were previously associated at one point with one or more virus indicators. Production server 105 could then provide a warning to the user, or even scan and remove any corresponding data later received from backup server 110 based on the requests.

Similarly, requests passed from production server 105 to backup server 110 for backup data can involve the same calculus. That is, management agent 135 could identify from the one or more requests that the requested data are associated with one or more virus indicators, or associated with one or more files that are in turn attached to one or more virus indicators. Management agent 135 could then remove the virus before returning the data, deny the request, or the like, depending on any number of various policy settings.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a production server in a computerized environment in which the production server is backed up by one or more backup servers, a method of managing virus and backup filtration processes through a common filter, comprising the acts of:
accessing one or more file writes at a combined antivirus/replication filter, the combined antivirus/replication filter containing both virus scanning capabilities and data replication capabilities;
utilizing the virus scanning capabilities of the combined antivirus/replication filter to scan the accessed one or more file writes in accordance with one or more virus definitions, including for each of the accessed one or more file writes:
detecting whether or not the accessed file write appears to contain a virus based on the one or more virus definitions;
taking one or more actions based on the whether or not the accessed file write appears to contain a virus; and
tagging the file write with one or more virus indicators representing virus information related to the accessed file write, the one or more virus indicators indicating whether or not the accessed file write appears to contain a virus and indicating the one or more actions taken such that virus information related the file write can be transferred along with the file write;
utilizing the data replication capabilities of the combined antivirus/replication filter to compare each of the accessed one or more file writes and corresponding virus indicator tags with one or more replica policies to determine which, if any, of the accessed one or more file writes is to be replicated; and
utilizing the data replication capabilities of the combined antivirus/replication filter to replicate at least one of the accessed one or more file writes along with its corresponding virus indicator tags such that virus information related to the at least one file write is propagated along with the at least one file write at a backup server, replication of the virus information permitting modules that subsequently access the at least one file write to make decisions with respect to the at least one file write without having to perform additional virus scans on the at least one file write.

2. The method as recited in claim 1, wherein the act of detecting whether or not the accessed file write appears to contain a virus based on the one or more virus definitions comprises an act of identifying the accessed file write as infected with any of the one or more viruses.

3. The method as recited in claim 2, wherein the act of tagging the file write with one or more virus indicators comprises an act of tagging the file write with one or more virus indicators before the one or more file writes are compared with the one or more replica configurations.

4. The method as recited in claim 3, wherein the one or more virus indicators identify that the virus was identified but not removed.

5. The method as recited in claim 3, further comprising an act of removing any of the one or more viruses, wherein the one or more virus indicators identify that the at least one file write was present but now removed.

6. The method as recited in claim 1, wherein the act of utilizing the data replication capabilities of the combined antivirus/replication filter to determine which, if any, of the accessed one or more file writes is to be replicated comprises an act of determining not to replicate at least one file write due to virus infection.

7. The method as recited in claim 1, further comprising the acts of:
receiving one or more requests to recover data stored at the backup server;
identifying that at least one of the one or more requests references data that is associated with one or more virus indicators.

8. The method as recited in claim 7, further comprising an act of sending one or more responses to the one or more requests based on the identified virus indicators.

9. The method as recited in claim 8, wherein at least one of the one or more responses indicates that the requested data:
(i) is associated with one or more viruses;
(ii) cannot be recovered due to one or more viruses; or
(iii) can only be recovered if the one or more viruses are first removed.

10. At a backup server in a computerized environment in which the backup server backs up data for one or more production servers, a method of managing replicated data in accordance with one or more virus indicators provided by a combined antivirus/replication filter containing both virus scanning capabilities and data replication capabilities, comprising the acts of:
receiving a data backup from one of the one or more production servers, the data backup requesting replication of a file write along with one more virus indicators indicating virus information related file write, the virus indicators tagged to the file write by virus scanning capabilities of the combined antivirus/replication filter during a prior virus scan of the file write such that the backup server can access the virus status of the file write without having to perform additional virus scans, the virus indicators indicating whether or not the file write at some point appeared to contain a virus and indicating any actions taken on the file write based on whether or not the file write at some point appeared to contain a virus;
accessing the one or more virus indicators from the data backup; and
applying one or more backup server policies for the backup server to the data request to identify one or more response actions that are to be taken for the data request based on the virus information indicated in the virus indicators.

11. The method as recited in claim 10, wherein the identified one or more response actions include removing one or more viruses from the file write.

12. The method as recited in claim 10, wherein the identified one or more response actions include one or more of:
cleansing at least a portion of the file write; and
cleansing a prior copy of the file write at the backup server.

13. A computer program product for use at a production server in a computerized environment in which the production server is backed up by one or more backup servers, the computer program product for implementing a method for managing virus and backup filtration processes through a common filter, the computer program product comprising a computer storage medium having stored thereon computer-executable instructions that, when executed at a processor, cause the production server to perform the method, including the following:

access a file write at a combined antivirus/replication filter, the combined antivirus/replication filter containing both virus scanning capabilities and data replication capabilities;

utilize the virus scanning capabilities of the combined antivirus/replication filter to scan the accessed file write in accordance with one or more virus definitions, including for the accessed file write:

detecting that the accessed file write appears to contain a virus based on the one or more virus definitions;

taking one or more actions to remove the virus based detecting that the accessed file write appears to contain a virus; and tagging the file write with one or more virus indicators representing virus information related to the accessed file write, the one or more virus indicators indicating that the accessed file write appeared to contain a virus and indicating the one or more actions taken to remove the virus such that virus information related the file write can be transferred along with the file write;

utilize the data replication capabilities of the combined antivirus/replication filter to compare the accessed file write and corresponding virus indicator tags with one or more replica policies to determine that the accessed file write is to be replicated; and utilize the data replication capabilities of the combined antivirus/replication filter to replicate the accessed file writes along with its corresponding virus indicator tags such that virus information related to the file write is propagated along with the file write at a backup server, replication of the virus information permitting modules that subsequently access the file write to make decisions with respect to the file write based on the file write having appeared to contain a virus and the one or more actions taken to remove the virus and without having to perform additional virus scans on the file write.

* * * * *

UNITED STATES PATENT AND TRADEMARK OFFICE
CERTIFICATE OF CORRECTION

| | | |
|---|---|---|
| PATENT NO. | : 7,730,538 B2 | Page 1 of 1 |
| APPLICATION NO. | : 11/421996 | |
| DATED | : June 1, 2010 | |
| INVENTOR(S) | : Robert M. Fries et al. | |

It is certified that error appears in the above-identified patent and that said Letters Patent is hereby corrected as shown below:

In column 8, line 13, before "a number" insert -- volume 145) --.

Signed and Sealed this
First Day of February, 2011

David J. Kappos
*Director of the United States Patent and Trademark Office*